United States Patent
Hachisuga

(10) Patent No.: US 11,079,516 B2
(45) Date of Patent: Aug. 3, 2021

(54) OPTICAL DEVICE, IMAGE READING DEVICE, AND IMAGE FORMING APPARATUS

(71) Applicant: FUJIFILM BUSINESS INNOVATION CORP., Tokyo (JP)

(72) Inventor: Masaki Hachisuga, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/515,469

(22) Filed: Jul. 18, 2019

(65) Prior Publication Data

US 2020/0310004 A1 Oct. 1, 2020

(30) Foreign Application Priority Data

Mar. 26, 2019 (JP) .............................. JP2019-058913

(51) Int. Cl.
| | |
|---|---|
| *H04N 1/04* | (2006.01) |
| *G02B 3/00* | (2006.01) |
| *G02B 5/00* | (2006.01) |
| *H04N 1/00* | (2006.01) |
| *H04N 1/028* | (2006.01) |

(52) U.S. Cl.
CPC ......... *G02B 3/0056* (2013.01); *G02B 3/0062* (2013.01); *G02B 5/003* (2013.01); *H04N 1/00997* (2013.01); *H04N 1/0282* (2013.01); *H04N 1/02895* (2013.01)

(58) Field of Classification Search
CPC .... G02B 3/0056; G02B 3/0062; G02B 5/003; G02B 3/005; H04N 1/00997; H04N 1/0282; H04N 1/02895

USPC ................................. 358/482, 483, 475, 509
See application file for complete search history.

(56) References Cited

U.S. PATENT DOCUMENTS

| | | | | |
|---|---|---|---|---|
| 5,121,254 A | * | 6/1992 | Hamanaka | G02B 3/0012 359/619 |
| 7,760,215 B2 | * | 7/2010 | Inoue | B41J 2/451 347/130 |
| 7,936,516 B2 | * | 5/2011 | Nagata | G02B 3/0068 359/621 |
| 8,638,484 B2 | * | 1/2014 | Nagata | G02B 3/0068 359/201.1 |
| 8,921,280 B2 | * | 12/2014 | Cho | G01N 21/6454 506/17 |
| 9,759,897 B2 | * | 9/2017 | Sugita | G02B 3/005 |
| 2001/0028506 A1 | * | 10/2001 | Fujimoto | H04N 1/0318 359/622 |

(Continued)

FOREIGN PATENT DOCUMENTS

| | | | | |
|---|---|---|---|---|
| JP | 2003-302504 A | | 10/2003 | |
| JP | 2007329714 A | * | 12/2007 | ........... G02B 3/0075 |

(Continued)

*Primary Examiner* — Cheukfan Lee
(74) *Attorney, Agent, or Firm* — Oliff PLC

(57) ABSTRACT

An optical device includes: a lens member including a plurality of lenses arranged such that optical axes of the lenses are substantially parallel to one another; and a light-transmitting member including: at least one light-transmitting part that is disposed to face the lens member, positioned on the optical axis of some of the plurality of lenses, and transmits light; and a light-shielding part that is provided on a surface of the light-transmitting part and blocks passage of light.

17 Claims, 15 Drawing Sheets

(56) References Cited

U.S. PATENT DOCUMENTS

| | | | |
|---|---|---|---|
| 2008/0031497 A1* | 2/2008 | Kishigami | G06K 9/00033 382/115 |
| 2008/0080046 A1* | 4/2008 | Yamamura | B41J 2/451 359/435 |
| 2008/0080057 A1* | 4/2008 | Yamamura | B41J 2/451 359/622 |
| 2008/0180759 A1* | 7/2008 | Nomura | B41J 2/451 358/494 |
| 2009/0009876 A1* | 1/2009 | Nomura | G02B 3/0012 359/622 |
| 2009/0129819 A1* | 5/2009 | Inoue | G03G 15/326 399/220 |
| 2009/0159195 A1* | 6/2009 | Segawa | B29D 11/00278 156/272.8 |
| 2009/0323191 A1* | 12/2009 | Yamamura | B41J 2/451 359/619 |
| 2010/0128353 A1* | 5/2010 | Nagata | G02B 3/0062 359/619 |
| 2010/0157429 A1* | 6/2010 | Yamamura | G02B 3/005 359/622 |
| 2010/0271705 A1* | 10/2010 | Hung | G02B 13/001 359/601 |
| 2011/0043872 A1* | 2/2011 | Mamada | G02B 27/0961 358/474 |
| 2011/0280628 A1* | 11/2011 | Kim | G02B 5/003 399/218 |
| 2012/0242884 A1* | 9/2012 | Ishiguro | H01L 27/14623 348/340 |
| 2018/0031741 A1* | 2/2018 | Suzuki | G02B 3/0075 |
| 2018/0158858 A1* | 6/2018 | Moriya | G02B 5/005 |
| 2020/0333642 A1* | 10/2020 | Hachisuga | G02F 1/0311 |
| 2021/0029265 A1* | 1/2021 | Asano | G02B 3/0062 |

FOREIGN PATENT DOCUMENTS

| | | | |
|---|---|---|---|
| JP | 2013195826 A | * | 9/2013 |
| JP | 2015-022163 A | | 2/2015 |
| JP | 2016-186580 A | | 10/2016 |

* cited by examiner

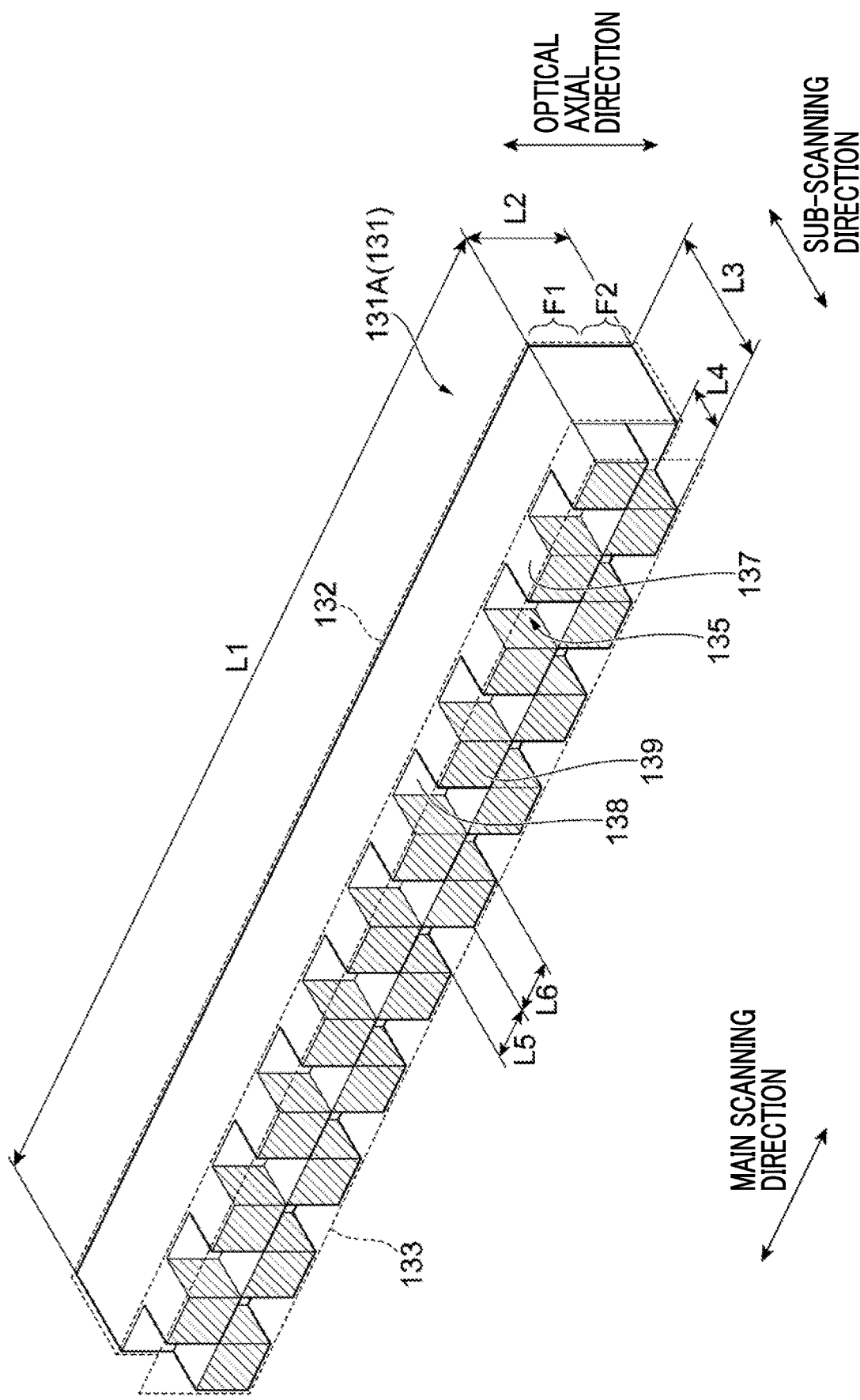

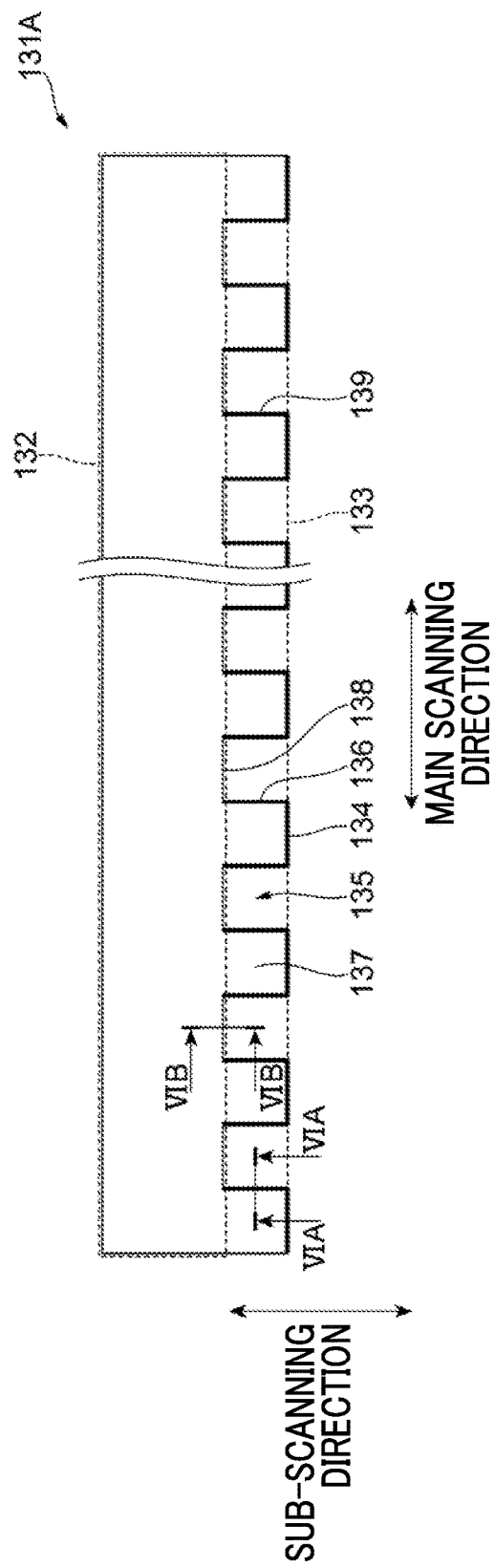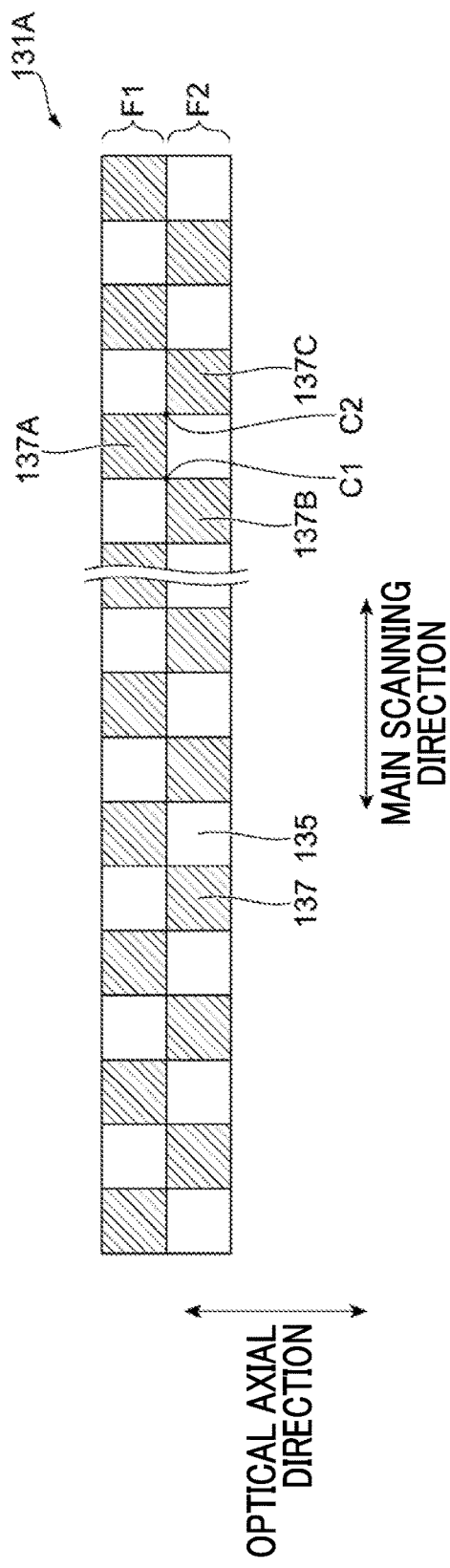

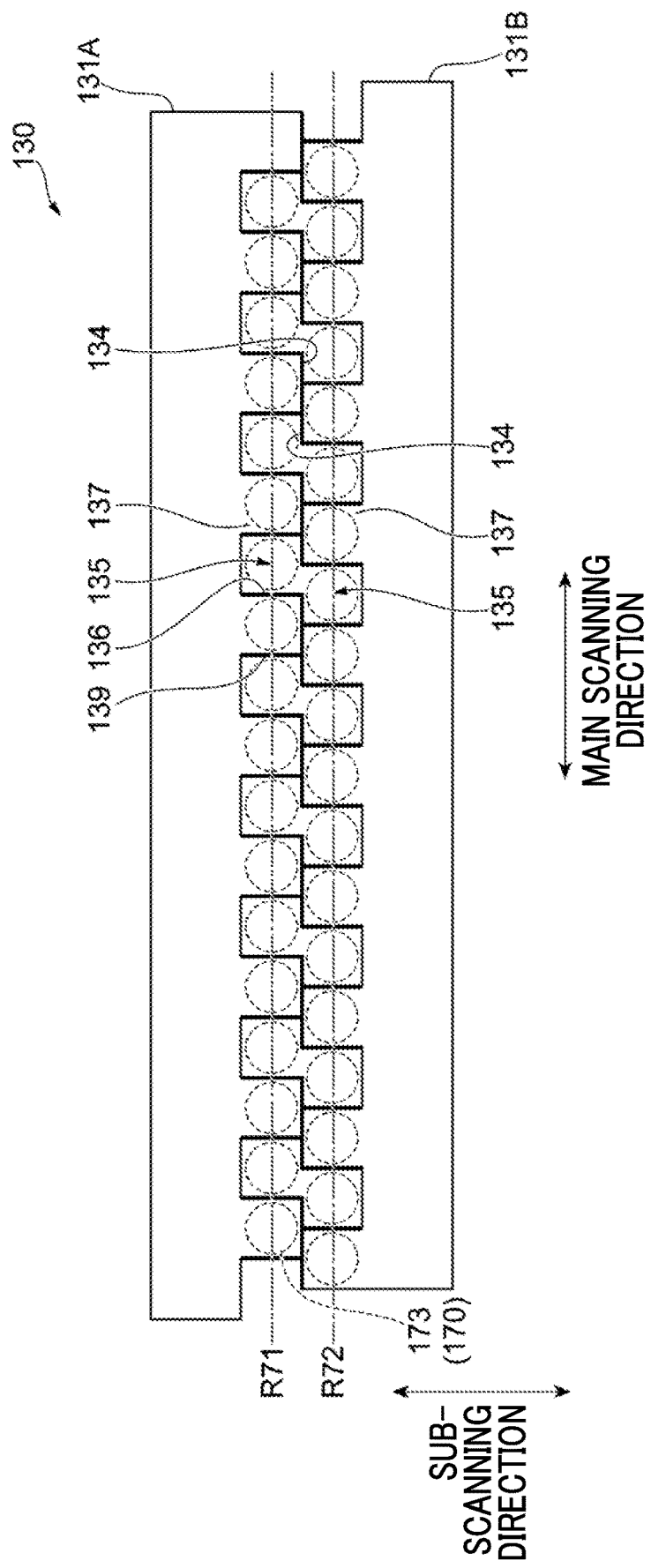

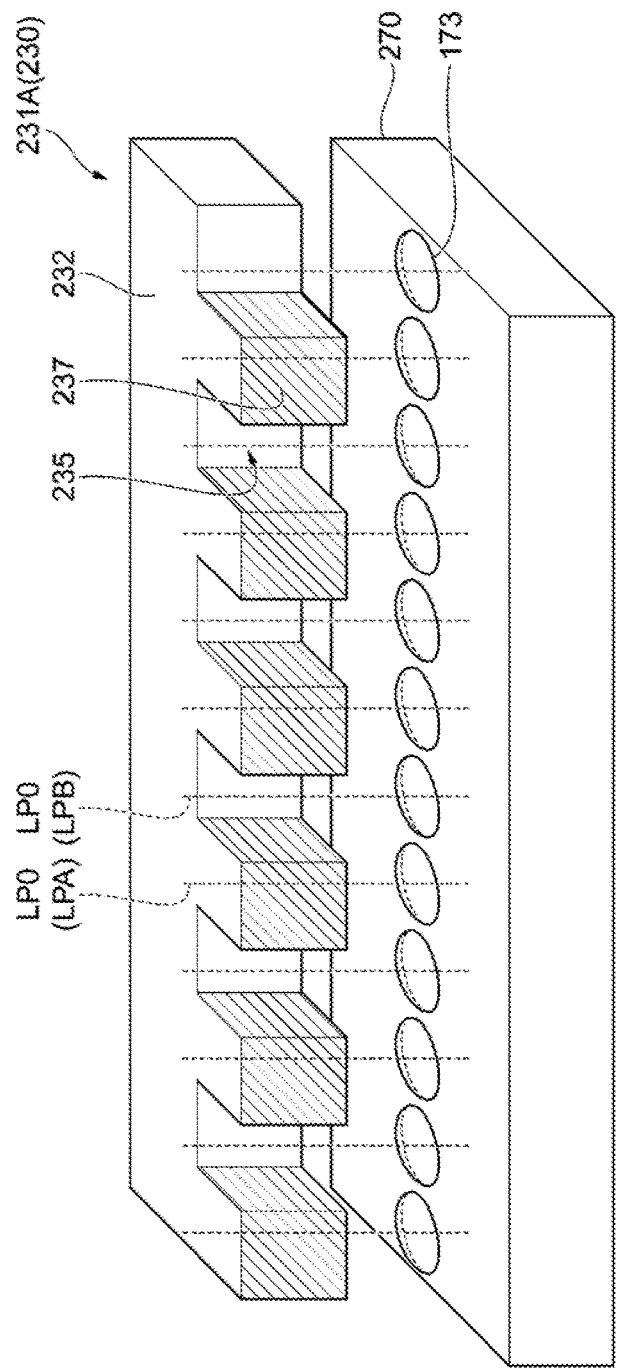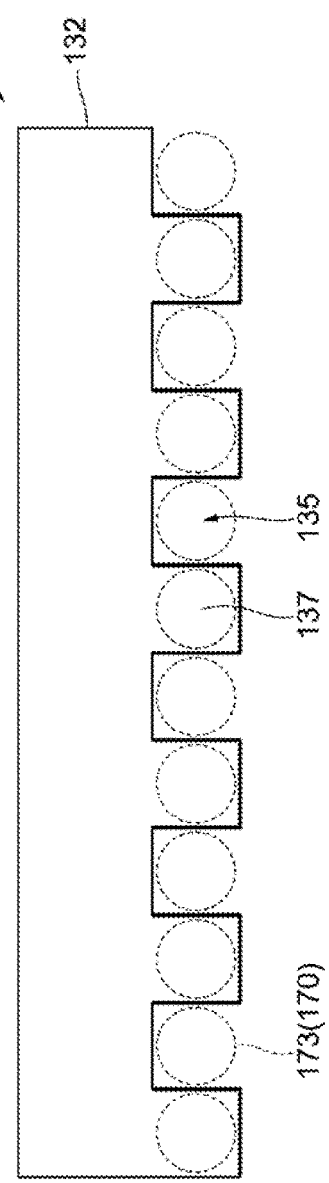
FIG. 8A
FIG. 8B

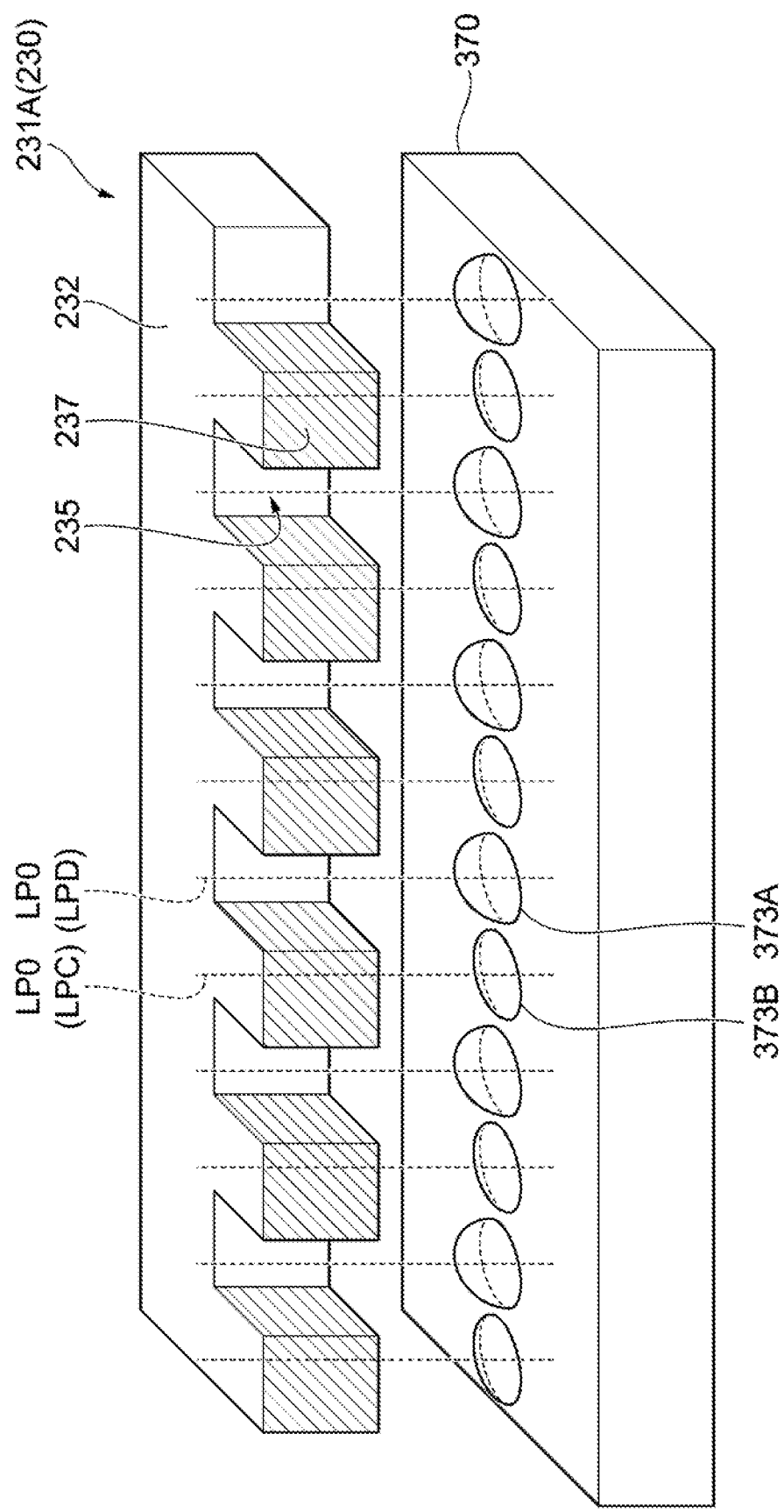

CIRCLE

SEMICIRCLE 0.75

SEMICIRCLE 0.6

LINE SEGMENT 0.18

OPTICAL DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2019-058913 filed Mar. 26, 2019.

BACKGROUND

(i) Technical Field

The present disclosure relates to an optical device, an image reading device, and an image forming apparatus.

(ii) Related Art

JP-A-2003-302504 discloses a lens array unit including at least one lens array in which plural lenses are arranged to form a line and which includes plural first lens surfaces for incident light and plural second lens surfaces for emitting light, a first light shielding mask which has plural through-holes penetrating in an axial length direction of each of lenses and covers a front face of the lens array in a state in which the plural through-holes are positioned on the front face of the first lens surface, and a second light shielding mask which has plural through-holes penetrating in an axial length direction of each of lenses and is provided on a rear face of the lens array such that the plural through-holes are positioned on the rear face of the second lens surface.

Meanwhile, for reducing stray light, a light shielding member which shields part of light passing through the lens may be provided on a lens member including plural lenses arranged such that optical axes are parallel to each other. Such a light shielding member is also known to have a structure having a light-passing through-hole on a position corresponding to each lens. In that case, if the distance between the lenses in the lens member is reduced, it is also necessary to reduce the distance between the through-holes in the light-shielding member. However, if the distance between the through-holes is reduced, molding failure may often occur in the light-shielding member.

SUMMARY

Aspects of non-limiting embodiments of the present disclosure relate to preventing molding failure for a structure for blocking passage of light in contrast to a case where plural through-holes are formed in a light-shielding member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an optical device including: a lens member including plural lenses arranged such that optical axes of the lenses are substantially parallel to one another; and a light-transmitting member including: at least one light-transmitting part that is disposed to face the lens member, positioned on the optical axis of some of the plural lenses, and transmits light; and a light-shielding part that is provided on a surface of the light-transmitting part and blocks passage of light.

BRIEF DESCRIPTION OF THE DRAWINGS

Exemplary embodiments of the present invention will be described in detail based on the following figures, wherein:

FIG. 4 is a perspective view of a first wall member;

FIGS. 5A and 5B are diagrams for explaining a configuration of the first wall member;

FIG. 7 is a diagram for explaining arrangement of the light shielding wall;

FIGS. 8A and 8B are diagrams for explaining a modification example of the wall member;

FIG. 9 is a diagram for explaining another modification example of the wall member;

DETAILED DESCRIPTION

Hereinafter, exemplary embodiments of the present disclosure will be described in detail with reference to drawings.

Image Forming Apparatus 100

Figure 1:
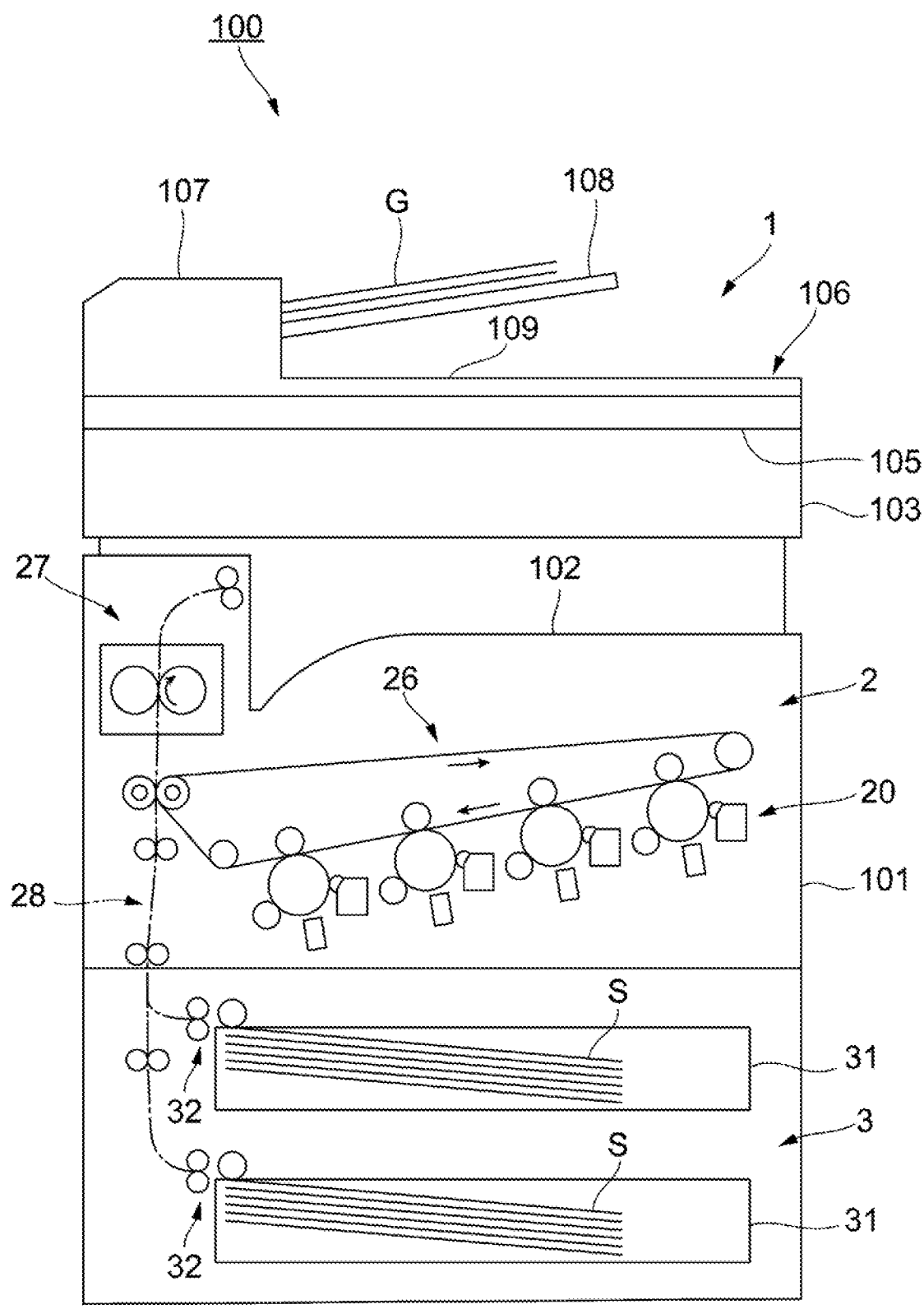
FIG. 1 is a schematic configuration diagram of an image forming apparatus to which the present exemplary embodiment is applied.

FIG. 1 is a schematic configuration diagram of an image forming apparatus 100 to which the present exemplary embodiment is applied.

As shown in FIG. 1, the image forming apparatus 100 includes a document reading device 1 that reads information of a document G, an image forming section 2 that forms an image on a recording sheet S based on the information of the document (read image) read by the document reading device 1, and a paper feeding section 3 that feeds the recording sheet S supplied to the image forming section 2. The image forming apparatus 100 accommodates the image forming section 2 and the paper feeding section 3 in a main body 101, and has the document reading device 1 disposed above the main body 101. The main body 101 has, on an upper surface portion thereof, a discharging and accommodating section 102 that discharges and accommodates the recording sheet S on which an image is formed.

The document reading device 1 has a housing 103. Also, the document reading device 1 has, on the upper surface portion of the housing 103, a light transparent document placing table 105 on which the document G is placed, and a document cover 106 that covers the document placing table 105 and can be opened and closed with respect to the housing 103. On the document cover 106, an auto document feeding section 107 that transports the document G to a reading position and discharges the read document G, a document tray 108 on which the document G transported from the auto document feeding section 107 is placed, and an accommodating section 109 that accommodates the document G discharged from the auto document feeding section 107 are provided.

The image forming section 2 includes an image forming unit 20 that forms toner images having colors of yellow (Y), magenta (M), cyan (C), and black (K), an intermediate transfer unit 26 that transports the toner image formed by the image forming unit 20 to transfer on the recording sheet S, and a fixing unit 27 that fixes the toner image transferred on the recording sheet S by the intermediate transfer unit 26.

The paper feeding section 3 has a drawer type container 31 on which plural recording sheets S that sizes or types thereof are predetermined can be mounted, and a feeding device 32 that feeds the recording sheet S accommodated in the container 31 to a transporting path one by one. A supply transporting path 28 through which the recording sheet S fed from the paper feeding section 3 is transported to a secondary transfer position is disposed between the paper feeding section 3 and the image forming section 2.

Next, a basic operation of the image forming apparatus 100 will be described.

First, in the document reading device 1, the document G is placed on any one of the document placing table 105 or the document tray 108 by a user. Then, when the user operates an operation button (not shown) or the like, the document reading device receives an instruction of document reading, then the reading operation with respect to the document G is started. That is, the document reading device 1 acquires reading information of the document G. Then, the image forming section 2 executes the image forming operation based on the reading information of the document G received from the document reading device 1. At this time, the recording sheet S is fed from the paper feeding section 3 in accordance with the operation of the image forming section 2. Then, the recording sheet S is discharged to the discharging and accommodating section 102 after the toner image is fixed to the recording sheet in the image forming section 2. Image forming operations described above are repeated for the number of documents G and the number of image forming sheets in the same manner.

Document Reading Device 1

Figure 2:
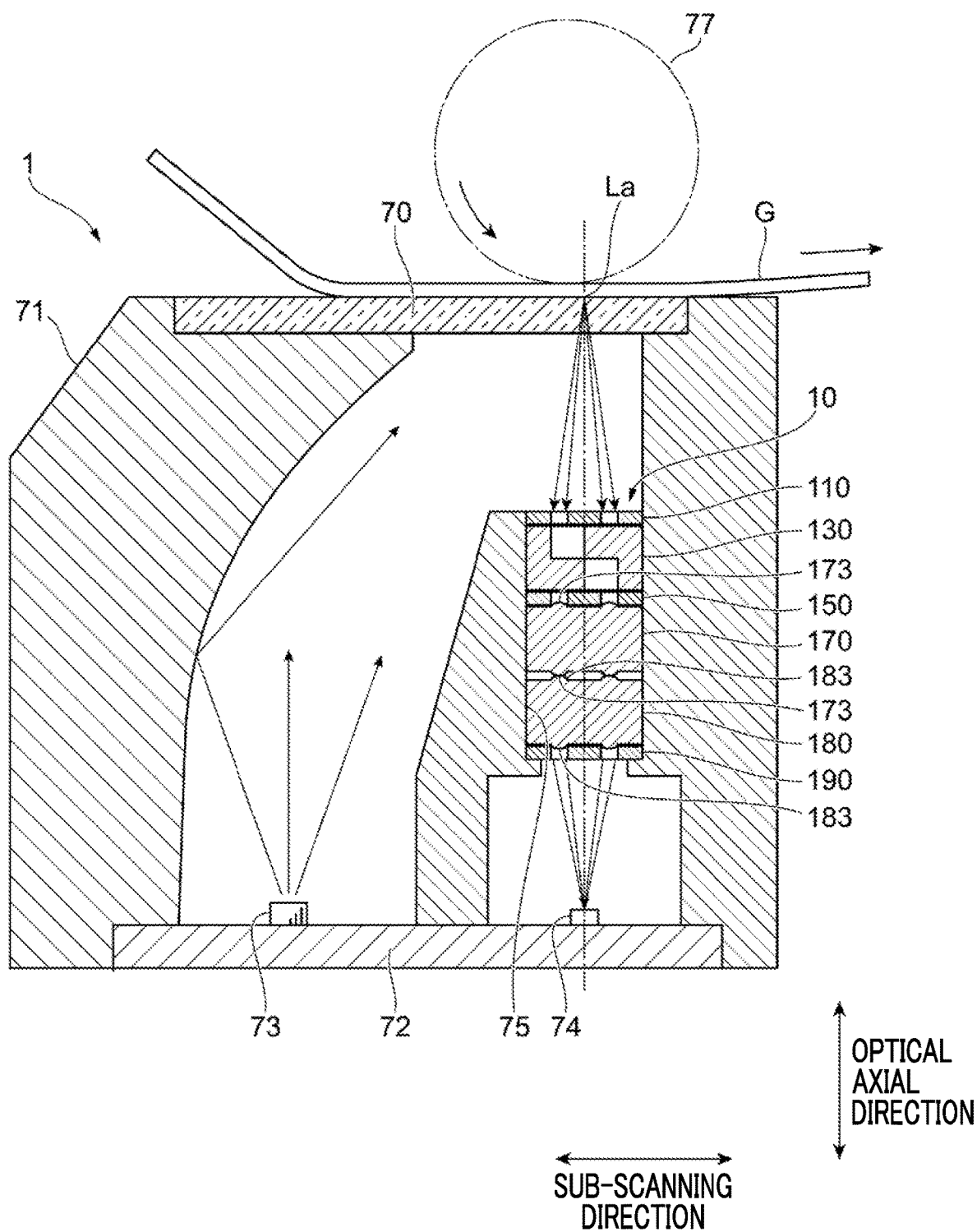
FIG. 2 is a schematic configuration diagram of a document reading device to which the present exemplary embodiment is applied.

FIG. 2 is a schematic configuration diagram of a document reading device 1 to which the present exemplary embodiment is applied.

Next, the document reading device 1 to which the present exemplary embodiment is applied will be described with reference to FIG. 2. As shown in FIG. 2, the document reading device 1 includes a transparent plate 70, a synthetic resin case 71 supporting the transparent plate 70, and a substrate 72 assembled to the bottom of the case 71. On a surface of the substrate 72, plural spot light sources 73 arranged in rows at an interval in a main scanning direction (a direction orthogonal to the paper surface), and plural light receiving elements 74 arranged in the same direction with the plural light sources 73 are provided. Each light source 73 is constituted by using, for example, a light emitting diode. Each light receiving element 74 has a photoelectric conversion function, when light is received, the light receiving element 74 outputs a signal of an output level corresponding to the light receiving amount, specifically, outputs an image signal.

Here, the document reading device 1 includes a lens array unit 10 between the transparent plate 70 and each light receiving element 74. A detailed configuration of the lens array unit 10 will be described later, the lens array unit 10 as shown is disposed in a recessed groove 75 provided in the case 71. Also, on the surface portion of the transparent plate 70 as shown, a portion facing the lens array unit 10 is an image reading region La extending in the main scanning direction. Light is applied from each light source 73 to the image reading region La.

In the document reading device 1, light from the light source 73 is applied to the document G guided onto the surface of the transparent plate 70 by the auto document feeding section 107 (refer to FIG. 1). The light applied to and reflected from the document G proceeds toward the lens array unit 10. Then, by acting of the lens array unit 10, the image for one line of the document G in the image reading region La is formed on the plural light receiving elements 74 in an erect equal-magnified manner. Therefore, plural light receiving elements 74 outputs the image signal for one line corresponding to the image of the document G. Such a reading process is repeatedly performed multiple times in the process that the document G is transported by, for example, a platen roller 77 included in the auto document feeding section 107 in a sub-scanning direction.

In the following description, the direction from the image reading region La to the light receiving element 74 (that is, a vertical direction in FIG. 2) may refer to as an optical axial direction.

Lens Array Unit 10

Figure 3:
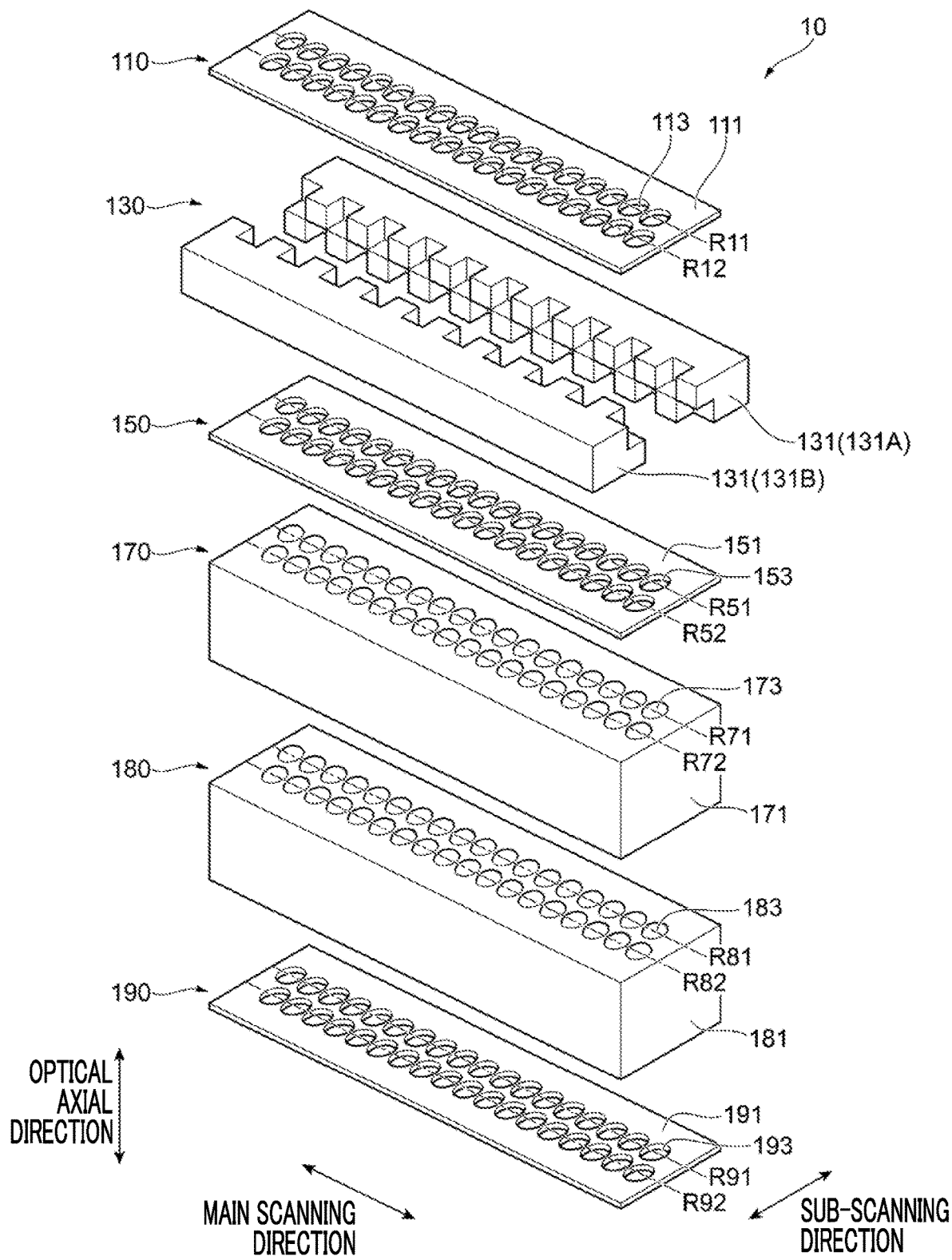
FIG. 3 is an exploded perspective view of a lens array unit to which the present exemplary embodiment is applied.

FIG. 3 is an exploded perspective view of a lens array unit 10 to which the present exemplary embodiment is applied.

Next, the lens array unit 10 to which the present exemplary embodiment is applied will be described with reference to FIG. 3.

As shown in FIG. 3, the lens array unit 10 includes a first light shielding film 110, a light shielding wall 130, a second light shielding film 150, a first lens array 170, a second lens array 180, and a third light shielding film 190. More specifically, in the lens array unit 10 illustrated, the first light shielding film 110, the light shielding wall 130, the second light shielding film 150, the first lens array 170, the second lens array 180, and the third light shielding film 190 are stacked in this order, and are bonded with an adhesive or the like to be integrated with each other. Hereinafter, each of the members included in the lens array unit 10 will be described.

First, the first lens array 170 and the second lens array 180 will be described.

Each of the first lens array 170 and the second lens array 180 is a member having substantially rectangular parallelepiped shape. More specifically, the first lens array 170 and the second lens array 180 as shown are a pair of lens members and have a shape coinciding each other.

The first lens array 170 has a substantially rectangular parallelepiped first support member 171, and plural first lenses 173 formed on the front and back surfaces of the first support member 171. The plural first lenses 173 are arranged such that the optical axes of the lenses are in parallel to each other. Also, the plural first lenses 173 are arranged in the first row R71 and the second row R72 along the main scanning direction. The plural first lenses 173 are disposed in a staggered manner. That is, the first lens 173 which constitutes the first row R71 and the first lens 173 which constitutes the second row R72 are shifted from each other in the main scanning direction. The first lenses 173 in the first row R71 are disposed at a predetermined interval, that is, a predetermined pitch. Also, the first lenses 173 in the second row R72 are disposed at the same interval with that of in the first row R71.

The second lens array 180 has a substantially rectangular parallelepiped second support member 181, and plural second lenses 183 formed on the front and back surfaces of the second support member 181. The plural second lenses 183 are arranged such that the optical axes of lenses are in parallel to each other. Also, the plural second lenses 183 are arranged in the first row R81 and the second row R82 along the main scanning direction. The plural second lenses 183 are disposed in a staggered manner. That is, the second lens 183 which constitutes the first row R81 and the second lens 183 which constitutes the second row R82 are shifted from each other in the main scanning direction. The second lenses 183 in the first row R81 are disposed at predetermined intervals or predetermined pitches. Also, the second lenses 183 in the second row R82 are disposed at the same intervals as in the first row R81.

In the shown example, the first lens array 170 and the second lens array 180 are disposed such that each of the first lenses 173 and each of the second lenses 183 face each other. More specifically, the optical axis of the first lens 173 and the optical axis of the second lens 183 are aligned to coincide with each other. The first lens array 170 and the second lens array 180 are integrally formed by injection molding, for example, using an optical resin having a light transmitting property. In the following description, if it is unnecessary to distinguish between the optical axis of the first lens 173 and the optical axis of the second lens 183, both may be simply referred to as "an optical axis of the first lens 173".

Next, the first light shielding film 110, the second light shielding film 150, and the third light shielding film 190 will be described. The first light shielding film 110, the second light shielding film 150, and the third light shielding film 190 are an elongated thin plate member. In the shown example, the first light shielding film 110, the second light shielding film 150, and the third light shielding film 190 are shaped to coincide each other.

The first light shielding film 110 has a first plate surface 111 having a substantially rectangular shape in a plan view. Plural first through-holes 113 are formed in the first plate surface 111. Here, each first through-hole 113 is substantially circular. A position of each first through-hole 113 corresponds to the first lens 173 and the second lens 183. That is, each first through-hole 113 is formed at a position where the optical axis of the first lens 173 passes. Also, the first through-holes 113 are arranged in the first row R11 and the second row R12 along the main scanning direction.

In the shown example, the first light shielding film 110 has a thickness thinner than that of the light shielding wall 130. That is, the first light shielding film 110 has a smaller dimension in the optical axial direction than the light shielding wall 130. Further, the first light shielding film 110 is formed of resin materials mixed with black pigment (for example, an acrylic resin). The first light shielding film 110 blocks light not contributing to focusing by the first lens 173 and second lens 183. More specifically, the first light shielding film 110 is provided on a side opposite the first lens 173 and the second lens 183 in the optical axial direction with the light shielding wall 130 interposed therebetween, in other words, on the upper surface of the light shielding wall 130, and shields a part of light directed to the light shielding wall 130. The first light shielding film 110 is an example of a covering member that covers a region facing a first wall member 131A and a second wall member 131B described later.

As described above, the first light shielding film 110, the second light shielding film 150, and the third light shielding film 190 are shaped to coincide each other. Although a detailed description will be omitted, therefore, the second light shielding film 150 has a second plate surface 151 in which plural second through-holes 153 are formed. Here, each second through-hole 153 is formed at a position where the optical axis of the first lens 173 passes. Also, the second through-holes 153 are provided in the first row R51 and the second row R52.

The third light shielding film 190 has a third plate surface 191 in which plural third through-holes 193 are formed. Here, each third through-hole 193 is formed at a position where the optical axis of the first lens 173 passes. Also, the third through-holes 193 are provided in the first row R91 and the second row R92.

Light Shielding Wall 130

FIG. 4 is a perspective view of a first wall member 131A.

FIGS. 5A and 5B are diagrams for explaining a configuration of the first wall member 131A. More specifically, FIG. 5A is a top view of the first wall member 131A and FIG. 5B is a front view of the first wall member 131A. In FIG. 5A, a description of the projecting portion 137 in a second layer F2 described later is omitted.

Next, the light shielding wall 130 will be described with reference to FIG. 3 to FIGS. 5A and 5B.

As shown in FIG. 3, the light shielding wall 130 includes two substantially rectangular parallelepiped wall members 131: the first wall member 131A and the second wall member 131B, arranged in parallel. More specifically, the light shielding wall 130 has the first wall member 131A and the second wall member 131B facing each other with the optical axis of the first lens 173 interposed therebetween.

Each of the first wall member 131A and the second wall member 131B is formed of an optical resin having light transmitting property. For example, the first wall member 131A and the second wall member 131b are integrally formed by injection molding. In the shown example, the first wall member 131A and the second wall member 131B are formed of the same material in the first lens array 170 and the second lens array 180, for example, an acrylic resin. Thus, even when humidity or temperature is changed, changes in the optical performance of the lens array unit 10 can be reduced.

The first wall member 131A and the second wall member 131B is a member of the same structure. Detailed structures will be described as follows with the first wall member 131A as an example.

As shown in FIG. 4 and FIG. 5A, the first wall member 131A is a substantially rectangular parallelepiped member with its longitudinal direction oriented along the main scanning direction. Further details will be described later, the first wall member 131A includes a light shielding film 139 that shields light to a portion of the outer surface of the first wall member 131A.

The first wall member 131A has, for example, a length L1 in the main scanning direction of 300 mm, a length L2 in the optical axial direction of 2.5 mm, and a length L3 in the sub-scanning direction of 3 mm. The first wall member 131A has a first side face 133 whose normal line being along the sub-scanning direction. The first side face 133 of the first wall member 131A is a surface facing the second wall member 131B.

The first wall member 131A has plural recessed portions 135 recessed in the sub-scanning direction from the first side face 133. The plural recessed portions 135 each form a substantially rectangular parallelepiped space, specifically, a substantially cubic shaped space. More specifically, the recessed portion 135 forms a substantially rectangular space as viewed in the optical axial direction. Also, the plural recessed portions 135 are provided in the main scanning direction at a predetermined interval. Further, the plural recessed portions 135 are formed in plural layers and the positions of the recessed portions in the main scanning direction are shifted from each other. Specifically, the plural recessed portions 135 are formed divided into a first layer F1 and a second layer F2 overlapping in the optical axial direction. Each of the plural recessed portions 135 is formed at a position where the optical axis of the first lens 173 passes.

As shown in FIG. 4, the first wall member 131A in which the plural recessed portions 135 is formed on the first side face 133 can be grasped as a configuration having a base 132 whose longitudinal direction extending along the main scanning direction, and plural projecting portions 137 projecting in the sub-scanning direction from the base 132. The base 132 is a portion on a side opposite to the projecting portion 137 from a virtual plane along the main scanning direction connecting bottom surfaces 138 of the recessed portions 135. In the shown example, the base 132 is a substantially rectangular shaped portion. The projecting portion 137 is a substantially rectangular parallelepiped portion, more specifically, a substantially cubic shaped portion. More specifically, each of the projecting portions 137 is a substantially rectangular portion as viewed in the optical axial direction. Also, the projecting portions 137 are disposed in the main scanning direction at a predetermined interval. Further, the projecting portions 137 are formed in plural layers and the positions of the recessed portions in the main scanning direction are shifted from each other. Specifically, they are divided into a first layer F1 and a second layer F2 in the optical axial direction.

In addition, when the first wall member 131A has a configuration common in the first layer F1 and the second layer F2, the component can be shared. More specifically, when the first wall member 131A includes the first layer F1 and the second layer F2 as a separate member rather than an integrally formed member described above, the first wall member 131A may be formed by overlapping the shared components.

Next, a positional relationship between the recessed portion 135 and the projecting portion 137 will be described. As shown in FIG. 5B, the recessed portion 135 and the projecting portion 137 are alternately arranged along the main scanning direction in the first layer F1 and the second layer F2. Each of the projecting portion 137 in the first layer F1 is provided continuously with any of the projecting portion 137 in the second layer F2. More specifically, for example, the first projecting portion 137A in the first layer F1 is provided continuously with the second projecting portion 137B and the third projecting portion 137C in the second layer F2, which are provided with the first projecting portion 137A interposed therebetween in the main scanning direction, via nook portions C1 and C2. Thus, light is prevented from directly entering from one recessed portion 135 to the other recessed portion 135.

As shown in FIG. 5B, one projecting portion 137 and one recessed portion 135 are arranged in the optical axial direction. Therefore, each optical axis of the first lens 173 passes one of the projecting portion 137 and the recessed portion 135 in the first layer F1, and passes the other of the projecting portion 137 and the recessed portion 135 in the second layer F2. More specifically, the optical axis passing through the projecting portion 137 in the first layer F1 passes through the recessed portion 135 in the second layer F2. Furthermore, the optical axis passing through the recessed portion 135 in the first layer F1 passes through the projecting portion 137 in the second layer F2. Accordingly, optical path lengths of optical axes coincide with each other.

Next, referring again to FIG. 4, an example of dimensions of each portion of the first wall member 131A will be described. In the shown example, a depth of the recessed portion 135 in the sub-scanning direction, in other words, a length L4 that is a projecting amount of the projecting portion 137 in the sub-scanning direction is 0.4 mm. The length L5 of each recessed portion 135 in the main scanning direction is 0.5 mm. The length L6 of each projecting portion 137 in the main scanning direction is 0.5 mm. That is, the recessed portion 135 and the projecting portion 137 have the same length in the main scanning direction. The lengths of the recessed portion 135 and the projecting portion 137 in the main scanning direction correspond to the lens pitches in the first lens array 170 and the second lens array 180. In the main scanning direction, the interval between the recessed portions 135 and the interval between the projecting portions 137 also correspond to the lens pitches in the first lens array 170 and the second lens array 180.

Light Shielding Film 139

Figure 6A:
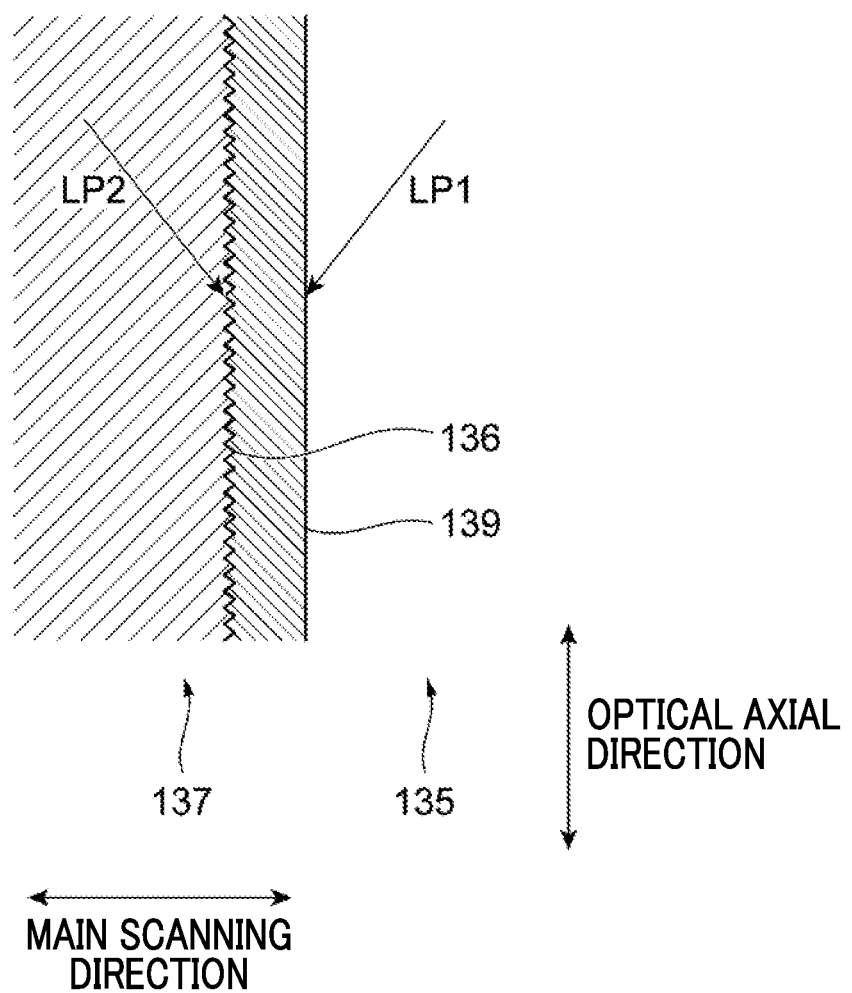
FIGS. 6A and 6B are diagrams for explaining a configuration of a light shielding film.
Figure 6B:
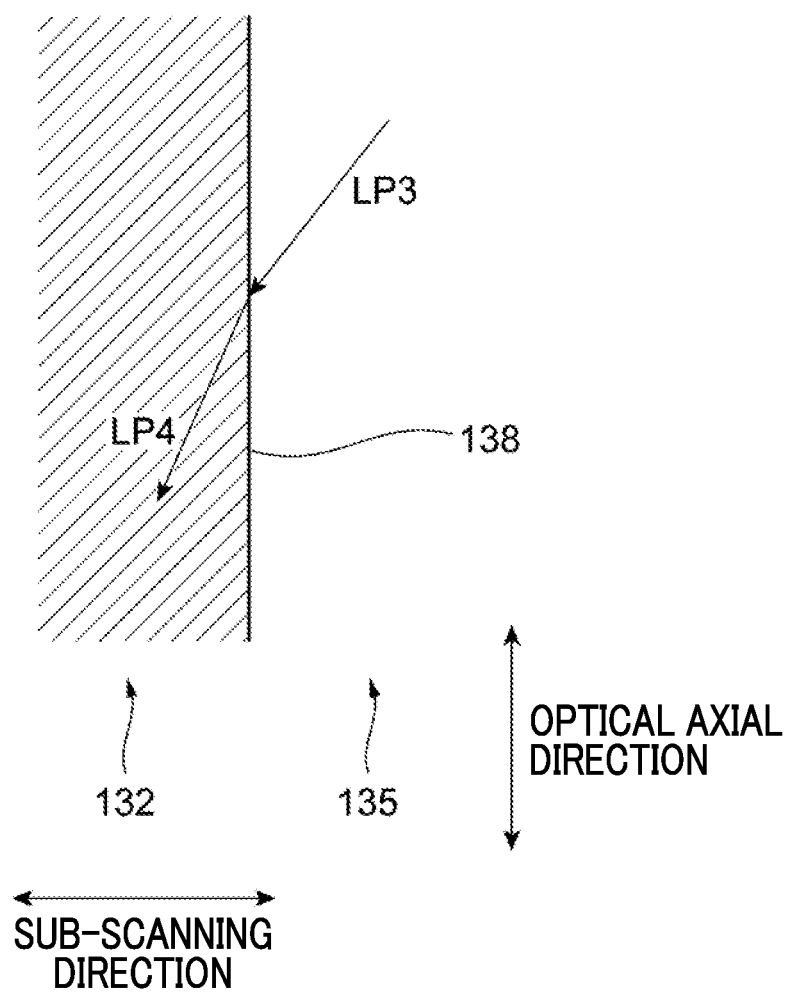

FIGS. 6A and 6B are diagrams for explaining a configuration of a light shielding film 139. More specifically, FIG. 6A is a cross-sectional view taken along VIA-VIA of FIG. 5A, and FIG. 6B is a cross-sectional view taken along VIB-VIB of FIG. 5A.

Next, the light shielding film 139 provided on a part of the surface of the first wall member 131A will be described with reference to FIGS. 5A to 6B.

As shown in FIG. 5A, the projecting portion 137 has a facing surface 134 disposed at an end part of the projecting portion 137 and facing the second wall member 131B (refer to FIG. 3). The facing surface 134 of the projecting portion 137 is a surface constituting a part of the first side face 133 and is flat. Further, the recessed portion 135 has an inner surface 136 and the bottom surface 138. The inner surface 136 of the recessed portion 135 is a surface whose normal line being along the main scanning direction. The bottom surface 138 of the recessed portion 135 is a surface whose normal line being along the sub-scanning direction.

As shown in FIG. 5A, the inner surface 136 and the facing surface 134 in the first wall member 131A are covered with the light shielding film 139. Potions other than the inner surface 136 and the facing surface 134 in the first wall member 131A are not covered with the light shielding film 139. With such a configuration, the first wall member 131A allows light to proceed in the optical axial direction, for example, allows light to be transmitted through the projecting portion 137 in the optical axial direction, and can be prevented from causing stray light described later.

More specifically, as shown in FIG. 6A, the inner surface 136 is covered with the light shielding film 139. Thus, the transmission of light LP1 is limited in the direction from the recessed portion 135 side to the projecting portion 137 side. The transmission of light LP2 is also limited in the direction from the projecting portion 137 side to the recessed portion 135 side. In other words, travel of light LP1 and light LP2 toward the optical axes adjacent to each other is limited in the main scanning direction.

Further, the surface roughness of the inner surface 136 is rougher than other portions in the first wall member 131A, for example, the bottom surface 138. Thus, in the inner surface 136 that is an interface of the projecting portion 137 and the light shielding film 139, specular reflection of light LP directed outside from the projecting portion 137 is prevented. The surface roughness defines the roughness of the surface, for example, is an arithmetic mean roughness (Ra) of the roughness curve defined in Japanese Industrial Standards (JIS). The inner surface 136 may be roughened using irregularities formed in advance in the corresponding portion of the mold for the injection molding. Also, the inner surface 136 may be roughened by blasting.

Although a detailed description will be omitted, the facing surface 134 of the projecting portion 137 is covered with the light shielding film 139. The surface roughness of the facing surface 134 is rougher than the bottom surface 138. Thus, in the facing surface 134 that is an interface of the projecting portion 137 and the light shielding film 139, specular reflection of light directed outside from the projecting portion 137 is prevented.

On the other hand, as shown in FIG. 6B, the bottom surface 138 is not covered with the light shielding film 139. Thus, it is permissible for light LP3 to transmit toward the base 132 side from the recessed portion 135 side (refer to light LP4 in FIG. 6B). In other words, it is permissible for light LP3 to progress in the sub-scanning direction. Thus, light LP3 incident on the bottom surface 138 is prevented from being specularly reflected to form stray light. Incidentally, the light shielding film 139 in the shown example is provided on the first wall member 131A by applying, for example, a resin.

Disposition of Light Shielding Wall 130

FIG. 7 is a diagram for explaining arrangement of the light shielding wall 130.

Next, the disposition of the light shielding wall 130 will be described with reference to FIG. 7.

First, as shown in FIG. 7, the first wall member 131A and the second wall member 131B are disposed so that the first side faces 133 thereof on which the recessed portion 135 is formed face each other (refer to FIG. 4). More specifically, the first wall member 131A and the second wall member 131B are disposed so that the facing surface 134 of the projecting portion 137 are abutted to each other. When viewed along the optical axial direction in FIG. 7, the recessed portion 135 and the projecting portion 137 are located to coincide with each first lens 173.

The first wall member 131A and the second wall member 131B formed as described above shield light not contributing to focusing by the first lens 173 and second lens 183. More specifically, in the first wall member 131A and the second wall member 131B, the light shielding film 139 of the inner surface 136 forms a wall that shields light progressing in the main scanning direction. Because the light shielding film 139 of the inner surface 136 forms a direction intersecting the optical axis, that is, an angle, light incident on the first lens 173 and the second lens 183 is shielded. Therefore, light incident from one lens of the first lens 173 and the second lens 183 onto the other lens adjacent to each other in the main scanning direction is reduced. Incidentally, the inner surface 136 is a surface positioned between the lenses among the first lens 173 and the second lens 183.

More specifically, in the first wall member 131A and the second wall member 131B, the light shielding film 139 of the facing surface 134 forms a wall that shields light progressing in the sub-scanning direction. Because the light shielding film 139 of the facing surface 134 forms a direction intersecting the optical axis, that is, an angle, light incident on the first lens 173 and the second lens 183 is shielded. Incidentally, the facing surface 134 is a surface positioned between the first row R71 and the second row R72 of the plural first lenses 173.

Accordingly, field angles of the first lens 173 and the second lens 183 are narrowed, the focal depth can be increased. Also, stray light may be less likely to occur in light passing through the first lens 173 and the second lens 183. Here, the field angle is a perspective angle of the ray of light with respect to the optical axial direction (an angle formed by the normal line and the ray of light). Further, stray light is light that the ray of light emitted from an object point of an object surface (that is, the image reading region La) reaches the position other than the image point corresponding on the image surface (that is, the light receiving element 74).

In general, if the lens pitch in the first lens array 170 and the second lens array 180, that is, the interval in the first lens 173 and the second lens 183 in the main scanning direction is narrowed, the optical performance of the first lens array 170 and the second lens array 180 is improved, for example, the light quantity of light reaching the light receiving element 74 increases (refer to FIG. 2).

Unlike the present exemplary embodiment, for example, a configuration that the light shielding wall 130 is formed in one rectangular shape and plural through-holes (not shown) are formed at a position corresponding to the optical axis of the first lens 173 can be adopted. However, in a case where such a configuration is adopted, the distance between the through-holes (not shown) of the light shielding wall 130 is narrowed in accordance with the narrow lens pitch in the first lens array 170 and the second lens array 180, as a result, for example, the wall thickness between the through-holes becomes thinner. The wall thickness becomes thinner than a predetermined thickness, for example, the wall thickness becomes 150 μm or less, when carrying out injection molding, the fluidity of the resin material is deteriorated in the thin portion, thus molding failure may occur.

On the other hand, in a configuration having the first wall member 131A and the second wall member 131B like the light shielding wall 130 in the present exemplary embodiment, even in a case where the interval of the recessed portion 135 in the first wall member 131A and the second wall member 131B is reduced, molding failure described above can be prevented.

MODIFICATION EXAMPLE 1

FIGS. 8A and 8B are diagrams for explaining a modification example of the wall member 131.

A modification example of the wall member 131 will be described with reference to FIGS. 8A and 8B. In the following description, the same components as the above exemplary embodiment may be assigned the same reference numerals and the description may be omitted.

As the above description, the first lens array 170 includes plural rows of the first lenses 173, but is not limited thereto. For example, as shown in FIG. 8A, the first lens array 270 may have a configuration having one row of the first lens 173. In a structure where the first lens array 270 includes one row of the first lens 173, the light shielding wall 230 may include one first wall member 231A. The first wall member 231A includes the projecting portion 237 and the recessed portion 235 alternately arranged in the main scanning direction. The projecting portion 237 and the recessed portion 235 are provided at a position where each optical axis LP0 of each of the first lenses 173 passes. As shown in FIG. 8B, when viewed along the optical axial direction, the recessed portion 135 and the projecting portion 137 are respectively disposed at a position coinciding with each first lens 173.

MODIFICATION EXAMPLE 2

FIG. 9 is a diagram for explaining another modification example of the wall member 131.

Another modification example of the wall member 131 will be described with reference to FIG. 8A to FIG. 9. In a configuration shown in FIGS. 8A and 8B, among the plural optical axes LP0, a part of optical axis LPA passes through the projecting portion 237 and another optical axis LPB passes through the recessed portion 235. Therefore, in such a configuration, the optical path difference is generated between the optical axis LPA passing through the projecting portion 137 and the optical axis LPB passing through the recessed portion 135.

In the modification example 2 shown in FIG. 9, the first lens 373 provided in the first lens array 370 is formed in one of two curvatures different from each other. That is, the first lenses 373 adjacent to each other in the main scanning direction are respectively formed in different curvature. More specifically, the first lens 373 is one of a small curvature lens 373A that the curvature is small (a radius of curvature is large) and a large curvature lens 373B that the curvature is large (a radius of curvature is small). The projecting portion 237 is disposed on the optical axis LPC passing through the large curvature lens 373B and the recessed portion 235 is disposed on the optical axis LPD passing through the small curvature lens 373A. Therefore, the optical path difference for each optical axis L0 is reduced as compared with the configuration shown in FIGS. 8A and 8B.

MODIFICATION EXAMPLE 3

Figure 10A:
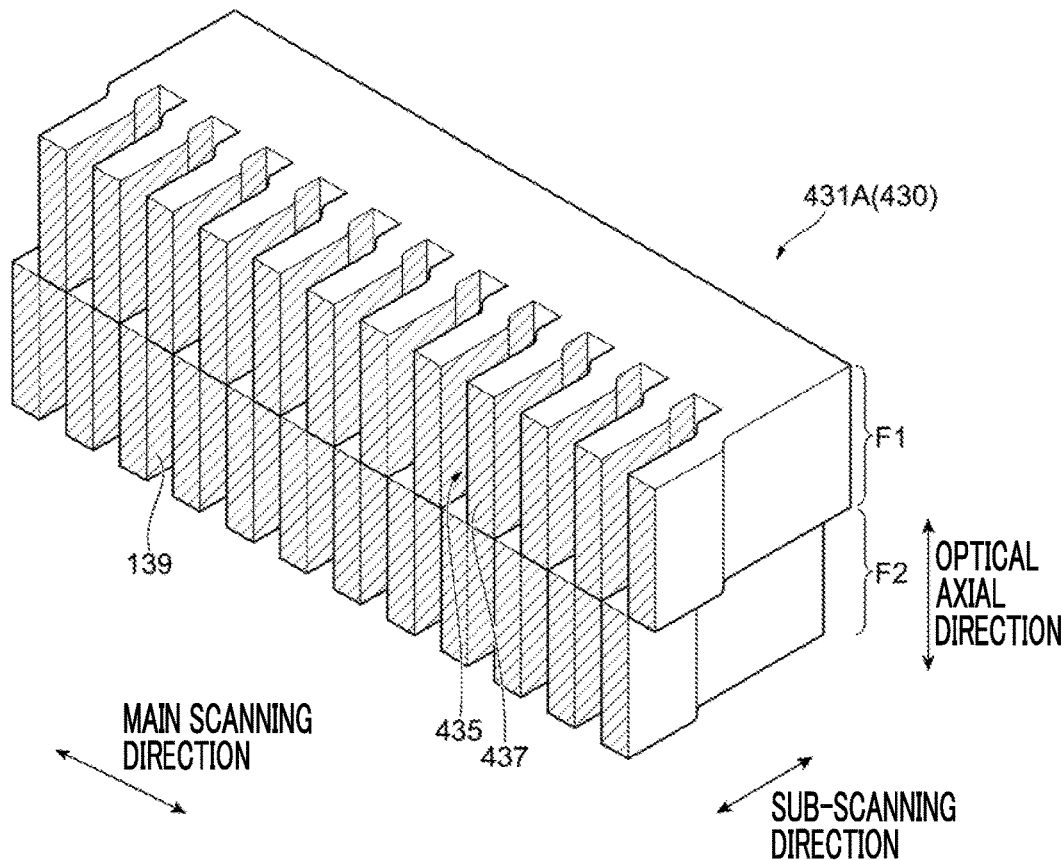
FIGS. 10A and 10B are diagrams for explaining another modification example of the wall member.
Figure 10B:
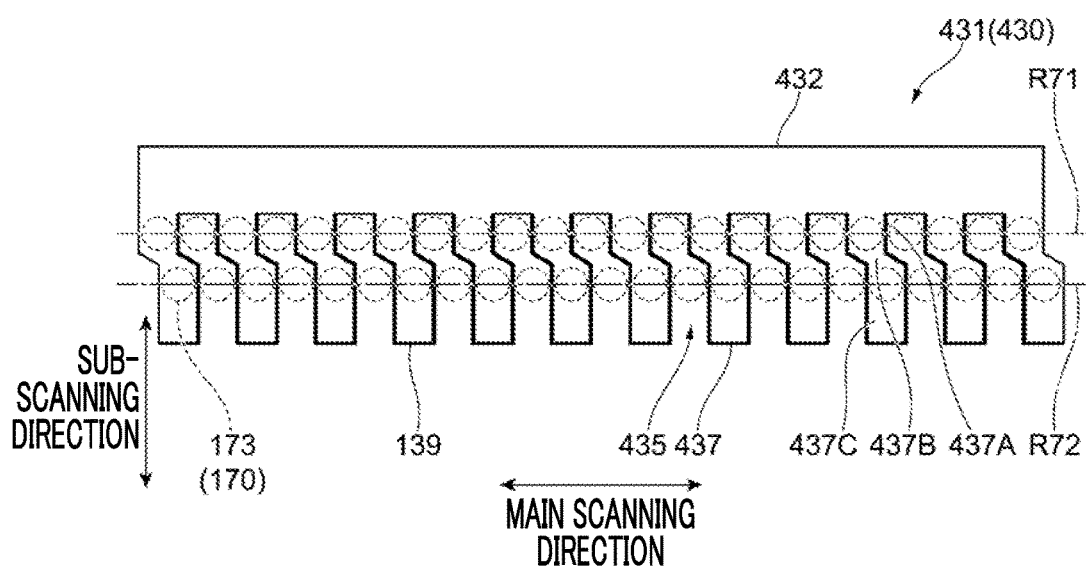

FIGS. 10A and 10B are diagrams for explaining another modification example of the wall member 131. More specifically, FIG. 10A is a perspective view of the wall member 431 and FIG. 10B is a top view of the wall member 431. In FIG. 10B, the description of the projecting portion 437 in the second layer F2 described later is omitted.

Another modification example of the wall member 131 will be described with reference to FIGS. 10A and 10B. As shown in FIGS. 10A and 10B, in a structure where the first lens array 170 has the first lens 173 of two rows, the light shielding wall 430 may include one first wall member 431A.

In such a configuration, each of the projecting portions 437 is formed to intersect the first row R71 and the second row R72. More specifically, as shown in FIG. 10B, the projecting portion 437 has a first portion 437A passing through the optical axis of the first lens 173 in the first row R71 and extending in the sub-scanning direction, an inclined portion 437B extending in a direction inclined respect to the sub-scanning direction from the first portion 437A, and the second portion 437C passing through the optical axis of the first lens 173 in the second row R72 and extending in the sub-scanning direction from the inclined portion 437B. With such a configuration, as shown in FIG. 3, the dimensions of the light shielding wall 430 in the sub-scanning direction can be reduced as compared with the case in which the light shielding wall 130 includes both of the first wall member 131A and the second wall member 131B. Incidentally, the projecting portion 437 can be regarded as a shape which bends at a portion where the first portion 437A and second portion 437C are continuous.

Unlike the shown example, even in a case where the first lens array 170 has the first lenses 173 of three or more rows, the light shielding wall 430 may include one first wall member 431A. That is, each of the projecting portions 437 may intersect the first lens 173 of three or more rows. In such a configuration, each of the projecting portions 437 may have plural inclined portions 437B, that is, may be bent at plural locations.

MODIFICATION EXAMPLE 4

Figure 11:
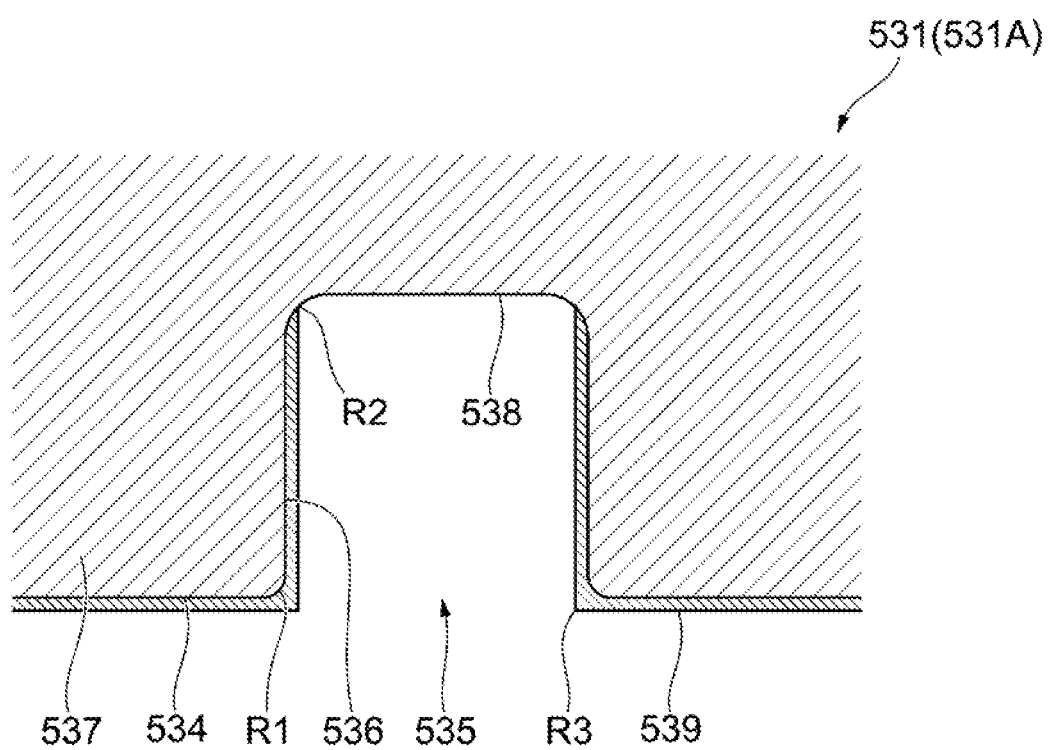
FIG. 11 is a diagram for explaining another modification example of the wall member.

FIG. 11 is a diagram for explaining another modification example of the wall member 131.

Another modification example of the wall member 131 will be described with reference to FIG. 11. In such FIG. 4, the recessed portion 135 and the projecting portion 137 have been described to be a substantially rectangular shape as viewed in the optical axial direction. As the wall member 531 shown in FIG. 11, the recessed portion 535 and the projecting portion 537 may have a curved surface.

More specifically, the wall member 531 shown in FIG. 11 includes a corner portion R1 formed with the facing surface 534 and the groove side surface 536, and a nook portion R2 formed with the groove side surface 536 and the groove bottom surface 538. The corner portion R1 and the nook portion R2 include the curved surface. The nook portion R2 has a smaller curvature than the corner portion R1 (a radius of curvature is large). Thus, the recessed portion 135 can be easily formed.

Further, in the shown example, the light shielding film 539 covering the facing surface 534 and the groove side surface 536 forms a corner portion R3 on the outer periphery of the corner portion R1. In other words, the light shielding film 539 makes an edge at the corner portion R1. Also, the corner portion R3 has a smaller curvature than the corner portion R1 (a radius of curvature is large). Therefore, a contact area of the projecting portions 537 becomes large when the first wall member 131A and the second wall member (not shown) of the wall member 531 are disposed so that projecting portions 537 thereof abut with each other. As a result, stray light can be further reduced.

MODIFICATION EXAMPLE 5

FIGS. 12A to 12D are diagrams for explaining a modification example of a first light shielding film 110.

A modification example of the first light shielding film 110 will be described with reference to FIGS. 12A to 12D. In the above description, the first light shielding film 110 (refer to FIG. 12A) has the substantially circular first through-hole 113 formed in the first plate surface 111 having a substantially rectangular shape in a plan view, but is not limited thereto. If the first light shielding film 110 is provided on the side opposite to the first lens 173 and the second lens 183 with the light shielding wall 130 interposed therebetween in the optical axial direction, and shields the part of light directed to the light shielding wall 130, the shape thereof is not particularly limited.

Figure 12A:
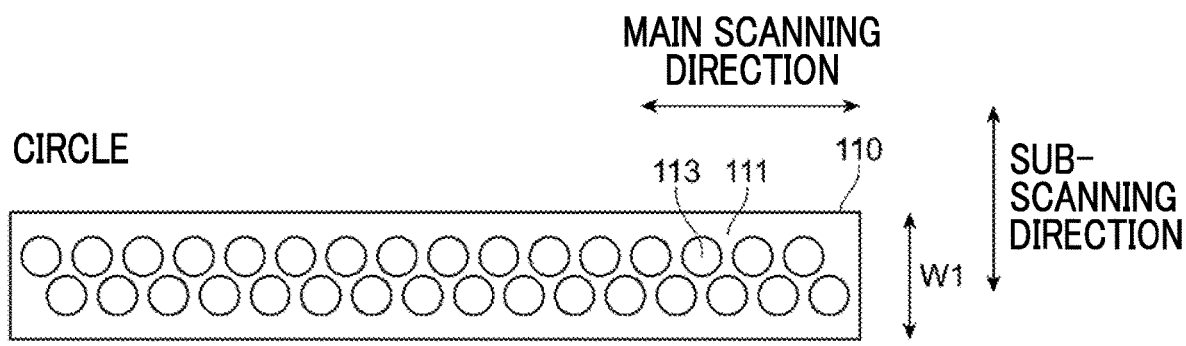
FIGS. 12A to 12D are diagrams for explaining a modification example of a first light shielding film.
Figure 12B:

For example, as the first light shielding film 210 shown in FIG. 12B, a configuration having a substantially semicircular first through-hole 213 formed in the first plate surface 211 having a substantially rectangular shape in a plan view may be adopted. The first light shielding film 210 shown in FIG. 12B can be regarded as a shape that both ends of the first light shielding film 110 (see FIG. 12A) in the width direction is cut off. For example, when the length W1 in the width direction of the first light shielding film 110 is 2 mm, the length W2 in the width direction of the first light shielding film 210 is 0.75 mm.

Figure 12C:
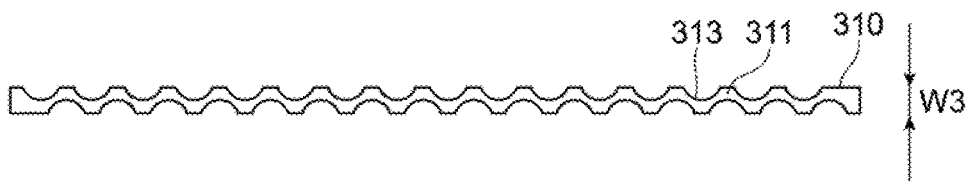

Also, as the first light shielding film 310 shown in FIG. 12C, a configuration having the first through-hole 313 formed in the first plate surface 311 having a substantially rectangular shape in a plan view may be adopted. The first through-hole 313 has a substantially semicircular shape, more specifically, a so-called arch shape formed by a circular arc and chord occupying narrower region than the semicircle. The first light shielding film 310 shown in FIG. 12C can be regarded as a shape that both ends of the first light shielding film 110 (see FIG. 12A) in the width direction is cut off. For example, when the length W1 in the width direction of the first light shielding film 110 is 2 mm, the length W3 in the width direction of the first light shielding film 310 is 0.6 mm.

Figure 12D:
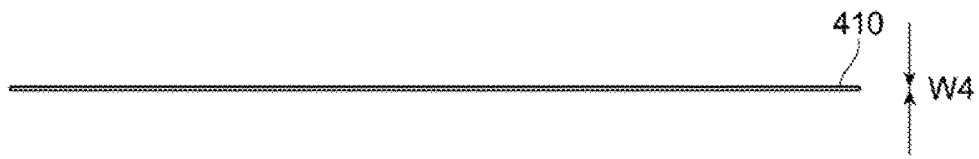

Also, as the first light shielding film 410 shown in FIG. 12D, the first light shielding film may have a substantially rectangular shape in a plan view. That is, a configuration not having the first through-hole 113 (FIG. 12A) may be adopted. The first light shielding film 410 is regarded as an elongate member disposed between the first row R71 and the second row R72 of the first lens 173 in the sub-scanning direction along the first row R71 and the second row R72. For example, the length W4 in the width direction of the first light shielding film 410 is 0.18 mm.

Figure 13A:
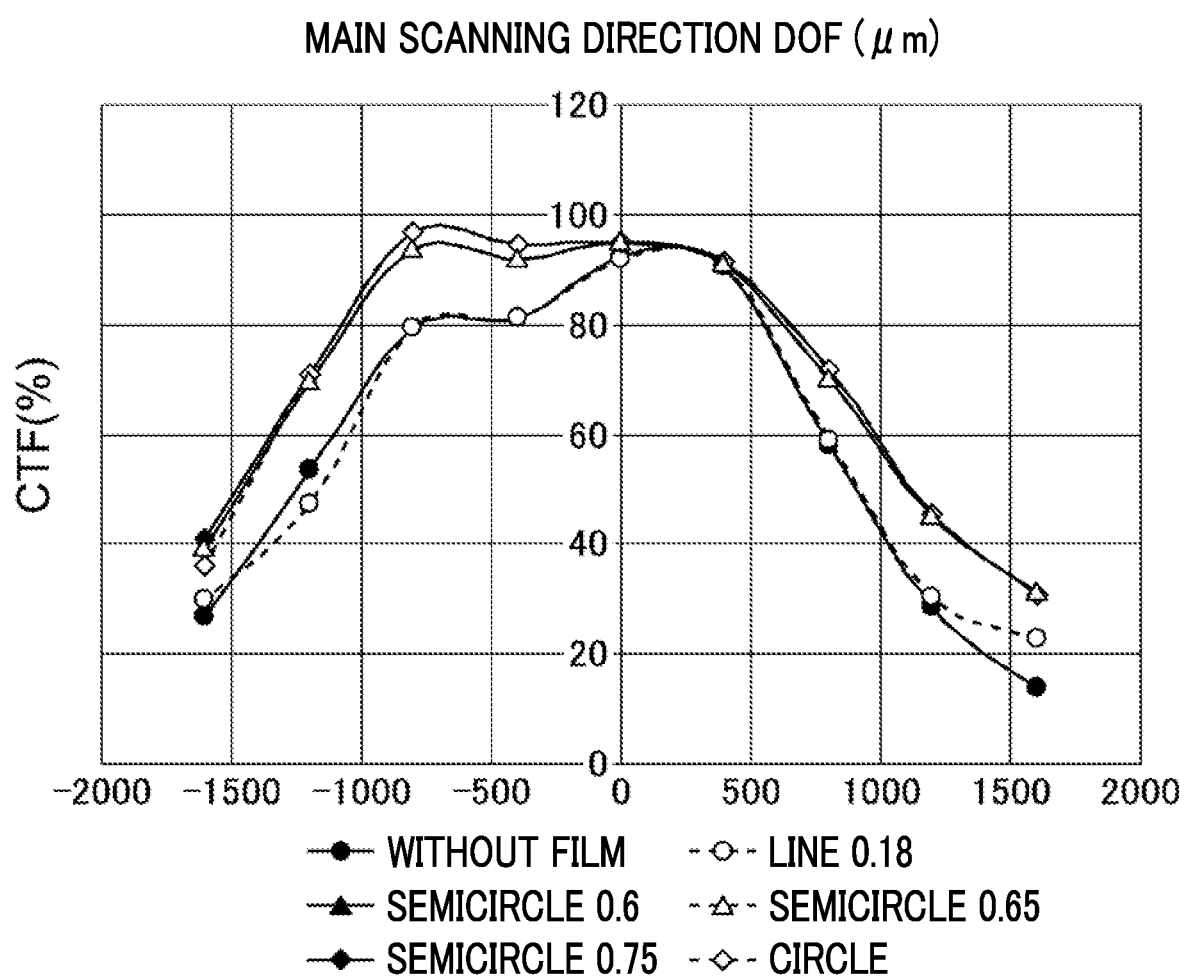
FIGS. 13A and 13B are diagrams showing a result of simulation that a shape of the first light shielding film is changed.
Figure 13B:
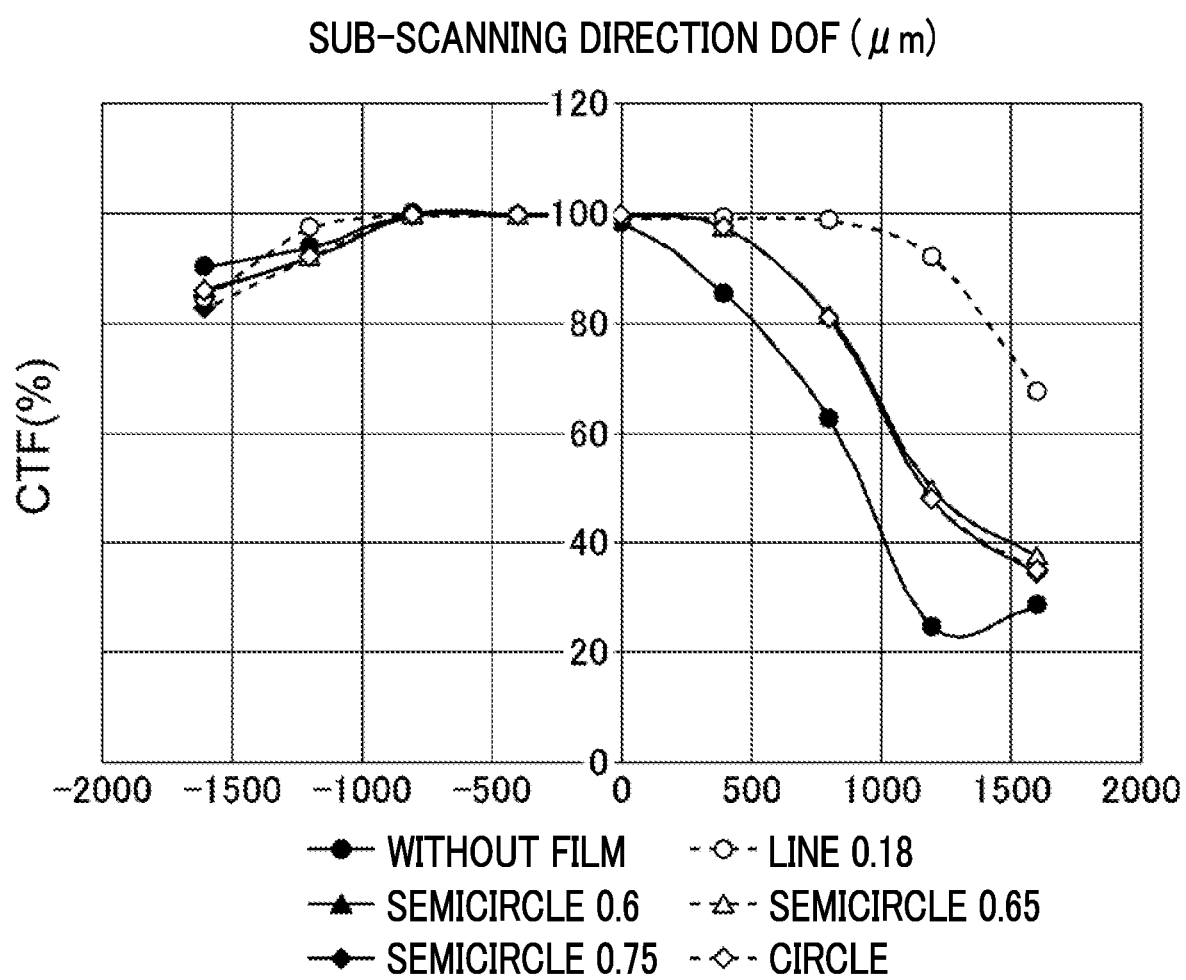

FIGS. 13A and 13B are diagrams showing a result of simulation that a shape of the first light shielding film 110 is changed. More specifically, FIG. 13A is a diagram showing a result of simulation of a relationship between the focal depth in the main scanning direction and the resolution (contrast transfer function: CTF) when the shape of the first light shielding film 110 is changed. FIG. 13B is a diagram showing a result of simulation of a relationship between the focal depth in the sub-scanning direction and the resolution when the shape of the first light shielding film 110 is changed.

Incidentally, the resolution in FIGS. 13A and 13B is a relative value of the density contrast of the read image on the document G in a case where the density contrast of the line image data to be written is 100%. A condition of the simulation is that first light shielding film 110 or the like of each shape is disposed on the stacked body in which the light shielding wall 130, the second light shielding film 150, the first lens array 170, the second lens array 180, and the third light shielding film 190 are stacked in this order, as the lens array unit 10 shown in FIG. 2.

Note that "semicircle 0.6" refers a shape in which both sides of the first light shielding film 110 in the sub-scanning direction are cut off and the length in the width direction of the first light shielding film is 0.6 mm. Further, for comparison, a condition not providing the first light shielding film 110 is "without film". Also, "line 0.18" is the first light shielding film 410 in FIG. 12D, "semicircle 0.6" is the first light shielding film 310 in FIG. 12C, "semicircle 0.75" is the first light shielding film 210 in FIG. 12B, and "circle" is the first light shielding film 110 in FIG. 12A.

A simulation result when the shape of the first light shielding film 110 is changed will be described with reference to FIGS. 12A to 13B.

As shown in FIGS. 13A and 13B, regarding the above first light shielding film 110, 210, 310, and 410, and the first light shielding film of "semicircle 0.65" (not shown), the relationship between the focal depth in the main scanning direction and the resolution, and the relationship between the focal depth in the sub-scanning direction and the resolution are respectively simulated.

According to FIGS. 13A and 13B, greater resolution is obtained in "line 0.18", "semicircle 0.6", "semicircle 0.65", "semicircle 0.75", and "circle" as compared to "without film". That is, it is confirmed that the optical performance of the lens array unit 10 is improved by disposing the first light shielding film 110 or the like. Incidentally, in the first light shielding film 410 which is "line 0.18", the resolution in the sub-scanning direction shown in FIG. 13B is greater as compared to "without film".

OTHER MODIFICATION EXAMPLES

In the above description, the first light shielding film 110 is provided, but it is not limited the film-like shape or materials. For example, the first light shielding film 110 may include a plate-shaped member having higher rigidity than that of the film. That is, a configuration having a light shielding plate instead of the first light shielding film 110 may be adopted. Furthermore, a configuration not having the first light shielding film 110 may be adopted.

Also, a configuration that the first through-holes 113, 213, or 313 are provided in the first light shielding film 110 is described, but it is not limited thereto as long as light passes through. For example, a configuration that the first through-holes 113, 213, or 313 are covered with a film or a plate transparent with respect to light emitted from the light source 73 may be adopted.

In the above description, one projecting portion 137 or one recessed portion 135 is disposed in each optical axis of the first lens 173, but one projecting portion 137 or one recessed portion 135 may be formed to across the optical axes of the plural first lenses 173. More specifically, the projecting portion 137 may be provided for every integral multiple of the lens pitch. More specifically, the recessed portion 135 may be provided for every integral multiple of the lens pitch.

Also, while the above description shows that the recessed portion 135 and the projecting portion 137 are formed in one layer (see FIGS. 8A and 8B) or two layers (see FIG. 4), the number of layers of the recessed portion 135 and the projecting portion 137 is not limited thereto. The recessed portion 135 and the projecting portion 137 may be formed in three or more layers.

The above description shows that the facing surface 134 and the inner surface 136 are roughened. That is non-limiting, and any function may be provided to reduce reflection between the facing surface 134 or the inner surface 136 and the light shielding film 139. For example, the rough surface may be replaced with any other component such as a film capable of reducing reflection between the facing surface 134 or the inner surface 136 and the light shielding film 139. Further, without being roughened, the facing surface 134 and the inner surface 136 may covered with the light shielding film 139.

The facing surface 134 is described to be covered with the light shielding film 139, but is not limited thereto. A configuration that the facing surface 134 is not covered with the light shielding film 139 may be adopted. That is, a configuration allowing light to transmit the facing surface 134 may be adopted.

The bottom surface 138 is described not to be covered with the light shielding film 139, but is not limited thereto. A configuration that the bottom surface 138 is covered with the light shielding film 139 similar to the facing surface 134 and the inner surface 136 may be adopted. By providing a configuration that the facing surface 134, the inner surface 136, and the bottom surface 138 are covered with the light shielding film 139, as compared to the configuration that the bottom surface 138 is not covered with the light shielding film 139, for example, in a manufacturing step, it is unnecessary to perform masking on the bottom surface 138 so that the light shielding film 139 is not applied to the bottom surface 138.

The lens array unit 10 is described to be provided in the document reading device 1, but is not limited thereto. For example, the lens array unit 10 may be provided to the optical device other than the document reading device 1 such as an imaging device that images light emitted from light emitting diode on the image holding member.

The first lens 173 described above is an example of the lens member. The light shielding wall 130 is an example of the light-transmitting member and the light shielding body. The light shielding film 139 is an example of the light-shielding part, another light-shielding part, and the coating portion. The recessed portion 135 is an example of the space and another space. The first wall member 131A is an example of the first light-transmitting member. The second wall member 131B is an example of the second light-transmitting member. The base 132 of the first wall member 131A is an example of the first base. The projecting portion 137 of the first wall member 131A is an example of the light-transmitting part, another light-transmitting part, the first light-transmitting part, and the first projecting portion. The base 132 of the second wall member 131B is an example of the second base. The projecting portion 137 of the second wall member 131B is an example of the second light-transmitting part, and the second projecting portion. The first light shielding film 110 is an example of the covering member. The first through-hole 113 is an example of the passing region. The light source 73 is an example of the irradiation section. The light receiving element 74 is an example of the light receiving section. The document reading device 1 is an example of the image reading device.

In above, various exemplary embodiments and modification examples are described, but they may be formed by combining these exemplary embodiments and modification examples to each other.

The present disclosure is not limited to the above exemplary embodiments and may be implemented in various forms without departing from the scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical device comprising:
 a lens member including a plurality of lenses arranged such that optical axes of the lenses are substantially parallel to one another; and
 a light-transmitting member including: at least one light-transmitting part that is disposed to face the lens member, positioned on the optical axis of some of the plurality of lenses, and transmits light; and a light-shielding part that is provided on a surface of the light-transmitting part and blocks passage of light, wherein
 the light-shielding part is provided between the lenses among the plurality of lenses,
 the some of the lenses are positioned at predetermined intervals among the plurality of lenses,
 a space is formed between a plurality of the light-transmitting parts and positioned on the optical axis of another lens than the some of the plurality of lenses,
 the light-transmitting member includes a plurality of other light-transmitting parts that transmit light to a position different from the space in a direction along the optical axis of the another lens,
 another space is formed between the other light-transmitting parts among the plurality of other light-transmitting parts at a position along the optical axis of the some of the lenses, and
 the plurality of other light-transmitting parts each have a portion continuous with any one of the plurality of light-transmitting parts in an arrangement direction of the plurality of lenses.

2. The optical device according to claim 1, wherein the light-transmitting member has another light-shielding part that is provided on a surface of the other light-transmitting part and blocks passage of light.

3. The optical device according to claim 1, wherein the plurality of lenses are arranged in a first row and a second row substantially parallel to each other, and each of the plurality of light-transmitting parts projects in an intersection direction intersecting an arrangement direction of the plurality of lenses, and intersects the optical axis of the lens in the first row and the optical axis of the lens in the second row.

4. The optical device according to claim 3, wherein each of the lenses in the first row and each of the lenses in the second row are disposed to be shifted from each other in the arrangement direction, and each of the plurality of light-transmitting parts is bent at a portion where a portion intersecting the optical axis of the lens in the first row is joined to a portion intersecting the optical axis of the lens in the second row.

5. The optical device according to claim 1, wherein the light-shielding part has a coating portion formed by coating the surface of the light-transmitting part.

6. The optical device according to claim 5, wherein a surface of the light-transmitting part covered with the coating portion is rougher than a surface of the light-transmitting part not covered with the coating portion.

7. An optical device comprising:
 a lens member including a plurality of lenses arranged such that optical axes of the lenses are substantially parallel to one another; and
 a light-transmitting member including: at least one light-transmitting part that is disposed to face the lens member, positioned on the optical axis of some of the plurality of lenses, and transmits light; and a light-shielding part that is provided on a surface of the light-transmitting part and blocks passage of light, wherein
 the plurality of lenses are arranged in a first row and a second row substantially parallel to each other, and
 the light-transmitting member includes:
  a first light-transmitting member having: a first base that is provided, at a position shifted from the optical axis of the lens in the first row, along an arrangement direction in which the lenses in the first row are arranged; and a plurality of first light-transmitting parts that project from the first base in an intersection direction intersecting the arrangement direction and are positioned on the optical axes of the lenses in the first row; and a second light-transmitting member having: a second base that is provided, at a position shifted from the optical axis of the lens in the second row, along the arrangement direction on a side opposite to the first base with the lens of the first row and the lens of the second row interposed therebetween, and a plurality of second light-transmitting parts that project from the second base in the intersection direction and are positioned on the optical axes of the lenses in the second row.

8. The optical device according to claim 7, wherein the light-shielding part is provided between the lenses in the arrangement direction of the first row and the second row, and between the first row and the second row.

9. The optical device according to claim 8, wherein an end portion of the first light-transmitting part in the first light-transmitting member is provided in contact with an end portion of the second light-transmitting part in the second light-transmitting member.

10. The optical device according to claim 9, wherein the end portion of the first light-transmitting part in the first light-transmitting member and the end portion of the second light-transmitting part in the second light-transmitting member are flat.

11. The optical device according to claim 7, further comprising:

a covering member that is provided on a side opposite to the lens member with the first light-transmitting member and the second light-transmitting member interposed therebetween in a direction along the optical axis of the lens, and covers a region facing the first light-transmitting member and the second light-transmitting member.

12. The optical device according to claim 11, wherein the covering member includes a passing region through which light passes on each of optical axes of the plurality of lenses.

13. The optical device according to claim 12, wherein the covering member has a thickness smaller than that of the first light-transmitting member and that of the second light-transmitting member in a direction along the optical axis of the lens.

14. An image reading device comprising:
an irradiation section that irradiates a document with light;
two lens members both including a plurality of lenses that are arranged such that optical axes of the lenses are substantially parallel to one another and through which light reflected from the document passes;
a light-transmitting member having:
    at least one light-transmitting part that is disposed to face one of the two lens members, positioned on the optical axis of some of the plurality of lenses, and transmits light; and
    a light-shielding part that is provided on a surface of the light-transmitting part and blocks passage of light; and
a light receiving section that receives light passing through the plurality of lenses,
wherein the at least one light-transmitting part is a physical element, and
wherein the light-transmitting member, the two lens members and the light receiving section are arranged along a direction of the optical axes so that the two lens members are between the light transmitting member and the light receiving section.

15. The image reading device according to claim 14, wherein
the optical axes of the two lens members coincide with one another, and
the light-shielding part and the light-transmitting part are integrated.

16. An image forming apparatus comprising:
an irradiation section that irradiates a document with light;
two lens members including a plurality of lenses that are arranged such that optical axes of the lenses are substantially parallel to one another and through which light reflected from the document passes;
a light-transmitting member having:
    at least one light-transmitting part that is disposed to face one of the two lens members, positioned on the optical axis of some of the plurality of lenses, and transmits light; and
    a light-shielding part that is provided on a surface of the light-transmitting part and blocks passage of light;
a light receiving section that receives light passing through the plurality of lenses; and
an image forming section that forms an image based on light received by the light receiving section,
wherein the at least one light-transmitting part is a physical element, and
wherein the light-transmitting member, the two lens members and the light receiving section are arranged along a direction of the optical axes so that the two lens members are between the light transmitting member and the light receiving section.

17. The image forming apparatus according to claim 16, wherein
the optical axes of the two lens members coincide with one another, and
the light-shielding part and the light-transmitting part are integrated.

* * * * *